US006979051B2

(12) United States Patent
Jones et al.

(10) Patent No.: US 6,979,051 B2
(45) Date of Patent: Dec. 27, 2005

(54) TRAILER HAVING IMPROVED SIDE WALL

(75) Inventors: John M. Jones, Bloomingdale, GA (US); Robert H. Belew, Jr., Savannah, GA (US); Eric C. D'Angelo, Savannah, GA (US); Daniel J. McCormack, Savannah, GA (US); William C. Atkins, Eden, GA (US)

(73) Assignee: Great Dane Limited Partnership, Chicago, IL (US)

( * ) Notice: Subject to any disclaimer, the term of this patent is extended or adjusted under 35 U.S.C. 154(b) by 0 days.

(21) Appl. No.: 11/046,736

(22) Filed: Jan. 31, 2005

(65) Prior Publication Data
US 2005/0134086 A1 Jun. 23, 2005

Related U.S. Application Data

(60) Division of application No. 10/720,560, filed on Nov. 24, 2003, now Pat. No. 6,866,330, which is a continuation of application No. 10/308,611, filed on Dec. 2, 2002, now Pat. No. 6,682,127, which is a division of application No. 09/909,065, filed on Jul. 19, 2001, now Pat. No. 6,497,451.

(51) Int. Cl.$^7$ ............................................. B62D 25/02
(52) U.S. Cl. ................................. 296/186.1; 296/182.1
(58) Field of Search ............................. 296/186.1, 191, 296/29, 181.1, 182.1, 187.01, 199, 203.03, 296/36

(56) References Cited

U.S. PATENT DOCUMENTS

| 1,701,714 | A |   | 2/1929  | Ballenger |
| 3,141,697 | A |   | 7/1964  | Tenenbaum et al. ........... 296/28 |
| 3,393,920 | A | * | 7/1968  | Ehrlich ..................... 296/181.6 |
| 3,547,483 | A |   | 12/1970 | Ehrlich .......................... 296/28 |
| 3,692,349 | A |   | 9/1972  | Ehrlich .......................... 296/28 |
| 3,711,148 | A |   | 1/1973  | Hindin .......................... 296/28 |
| 3,815,500 | A |   | 6/1974  | Glassmeyer ................ 105/369 |
| 4,046,278 | A |   | 9/1977  | Chieger et al. .............. 220/1.5 |
| 4,065,168 | A |   | 12/1977 | Gregg ........................... 296/28 |
| 4,212,405 | A |   | 7/1980  | Schmidt ..................... 220/1.5 |
| 4,214,789 | A |   | 7/1980  | Katz et al. ................... 296/183 |
| 4,252,067 | A |   | 2/1981  | Stark .......................... 105/406 |
| 4,357,047 | A | * | 11/1982 | Katz ........................ 296/186.1 |
| 4,420,183 | A |   | 12/1983 | Sherman ..................... 296/181 |
| 4,437,699 | A |   | 3/1984  | Lewis et al. .............. 296/186.1 |
| 4,498,264 | A |   | 2/1985  | McCafferty et al. ........... 52/281 |
| 4,592,585 | A |   | 6/1986  | Oren et al. ................. 296/181 |
| 4,810,027 | A |   | 3/1989  | Ehrlich ....................... 296/181 |

(Continued)

FOREIGN PATENT DOCUMENTS

CA           2332565           1/2001

OTHER PUBLICATIONS

Drawing 40907700.
Drawing 11430156.

*Primary Examiner*—Kiran B. Patel
(74) *Attorney, Agent, or Firm*—Nelson Mullins Riley & Scarborough, LLP

(57) ABSTRACT

A cargo trailer includes a floor and a side wall extending vertically upward from a side edge of the floor. The side wall includes a plurality of generally vertical posts. Each post defines an interior surface disposed in a generally common plane and a recessed portion. A scuff band is received within the recessed portions so that at least a portion of the scuff band is outward of the common plane.

12 Claims, 12 Drawing Sheets

U.S. PATENT DOCUMENTS

| | | | | |
|---|---|---|---|---|
| 4,904,017 | A | 2/1990 | Ehrlich | 296/181 |
| 5,041,318 | A | 8/1991 | Hulls | 428/57 |
| 5,058,756 | A | 10/1991 | Green | 220/1.5 |
| 5,066,066 | A | 11/1991 | Yurgevich et al. | 296/186.1 |
| 5,112,099 | A | 5/1992 | Yurgevich et al. | 296/181 |
| 5,195,800 | A | 3/1993 | Stafford et al. | 296/181 |
| 5,320,396 | A | 6/1994 | Petelka | 296/43 |
| 5,348,176 | A * | 9/1994 | Yurgevich et al. | 220/1.5 |
| 5,433,501 | A | 7/1995 | Thomas et al. | 296/191 |
| 5,439,266 | A | 8/1995 | Ehrlich | 296/181 |
| 5,507,405 | A | 4/1996 | Thomas et al. | 220/1.5 |
| 5,509,714 | A | 4/1996 | Schmidt | 296/181 |
| 5,584,252 | A | 12/1996 | Smith et al. | 105/409 |
| 5,584,527 | A | 12/1996 | Sitter | 296/181 |
| 5,664,826 | A | 9/1997 | Wilkens | 296/181 |
| 5,690,378 | A | 11/1997 | Romesburg | 296/181 |
| 5,700,118 | A | 12/1997 | Bennett et al. | 410/113 |
| 5,772,276 | A | 6/1998 | Fetz et al. | 296/181 |
| 5,860,693 | A * | 1/1999 | Ehrlich | 296/186.1 |
| 5,876,089 | A | 3/1999 | Ehrlich | 296/181 |
| 5,890,757 | A * | 4/1999 | Masterson et al. | 296/182.1 |
| 5,934,742 | A | 8/1999 | Fenton et al. | 296/181 |
| 5,934,849 | A * | 8/1999 | Haire | 410/113 |
| 5,938,274 | A | 8/1999 | Ehrlich | 296/191 |
| 5,992,117 | A | 11/1999 | Schmidt | 52/582.1 |
| 5,997,076 | A | 12/1999 | Ehrlich | 296/181 |
| 6,003,932 | A | 12/1999 | Banerjea et al. | 296/181 |
| 6,010,020 | A | 1/2000 | Abal | 220/1.5 |
| 6,199,939 | B1 | 3/2001 | Ehrlich | 296/181 |
| 6,220,651 | B1 | 4/2001 | Ehrlich | 296/181 |
| 6,322,127 | B1 | 11/2001 | Masterson et al. | 296/100.02 |
| 6,412,854 | B2 | 7/2002 | Ehrlich | 296/191 |
| 6,422,156 | B1 * | 7/2002 | Winsor et al. | 105/355 |
| 6,497,451 | B1 | 12/2002 | Jones et al. | 296/186.1 |
| 6,527,335 | B1 | 3/2003 | Yurgevich | 296/186.1 |
| 6,607,237 | B1 * | 8/2003 | Graaff et al. | 296/186.1 |
| 6,626,622 | B2 * | 9/2003 | Zubko | 296/186.1 |
| 6,652,018 | B2 | 11/2003 | Buchholz et al. | 296/191 |
| 6,682,127 | B2 | 1/2004 | Jones et al. | 296/187.03 |
| 6,802,521 | B1 * | 10/2004 | Boughton | 296/36 |
| 6,832,808 | B1 * | 12/2004 | Bennett | 296/186.1 |
| 2003/0071486 | A1 | 4/2003 | Graaff et al. | |
| 2004/0256887 | A1 * | 12/2004 | Buchholz et al. | 296/186.1 |
| 2005/0116504 | A1 * | 6/2005 | Yurgevich et al. | 296/186.1 |

* cited by examiner

TRAILER HAVING IMPROVED SIDE WALL

This is a division of U.S. application Ser. No. 10/720,560, filed Nov. 24, 2003, now U.S. Pat. No. 6,866,330, which is a continuation of U.S. application Ser. No. 10/308,611, filed Dec. 2, 2002 (now U.S. Pat. No. 6,682,127), which is a division of U.S. application Ser. No. 09/909,065, filed Jul. 19, 2001 (now U.S. Pat. No. 6,497,451), the entire disclosure of each of which are incorporated by reference herein.

BACKGROUND OF THE INVENTION

A wide variety of trailers are known for carrying cargo. For example, van type trailers typically include a deck assembly supported by a side wall structure, wheels and front legs. The deck assembly may include longitudinal floor boards and transverse cross-members, such as I-beams, extending between opposing bottom rails. The deck transfers its load to the bottom rails, wheels, and, depending upon whether or not the trailer is coupled to a tractor or is free-standing, to a tractor fifth wheel or to retractable front legs on the trailer.

In a monocoque type trailer, individual interior side wall panel members and an outer skin are joined together, often by a post, channel or zee-shaped structural member, and to a subframe to form a self-supporting body construction. The outer skin and inner panel members may carry some of the stresses between the posts, floor and roof of the trailer.

For example, it is known for the interior panels and the outer skin to attach to a plurality of vertical posts spaced apart along the trailer side wall. Referring to the cross-sectional view of a prior art vertical post shown in FIG. 1, a vertical post 1 includes a longitudinal central section 2 and a pair of first longitudinal flanges 3 disposed on either side of central section 2 and recessed from central section 2 between the central section and an outer skin 4. The outer skin is fastened to a pair of second longitudinal flanges 5 by any suitable means, such as rivets (not shown). Side wall liner panels 6 are attached to the posts at first longitudinal flanges 3 by tapit pins 7.

It is known to include a scuff band along the interior surface of a trailer wall to prevent damage to the wall when cargo is loaded into or removed from the trailer. If provided, the protective scuff band generally protrudes into an otherwise useable storage area within the trailer.

SUMMARY OF THE INVENTION

The present invention recognizes and addresses the foregoing considerations, and others, of prior art construction and methods. Accordingly, it is an object of the present invention to provide an improved trailer.

This and other objects are achieved by a trailer having a floor and first side wall that extends vertically upward from a side edge of the floor. The side wall includes a plurality of elongated vertical posts. Each post defines a longitudinal interior surface with a first portion disposed in a generally common plane and a second portion recessed from the plane. A scuff band is received within the recessed portions so that an interior facing surface of the scuff band is generally coplanar with or inward of the side wall's interior surface.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
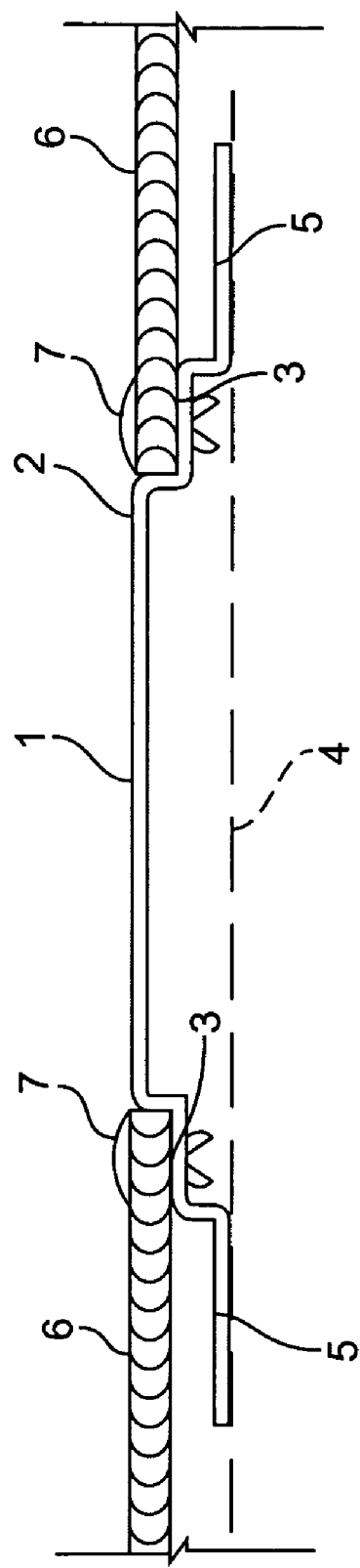
FIG. 1 is a cross-sectional view of a prior art side wall post.

Repeat use of reference characters in the present specification and drawings is intended to represent same or analogous features or elements of the invention.

DETAILED DESCRIPTION OF PREFERRED EMBODIMENT

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
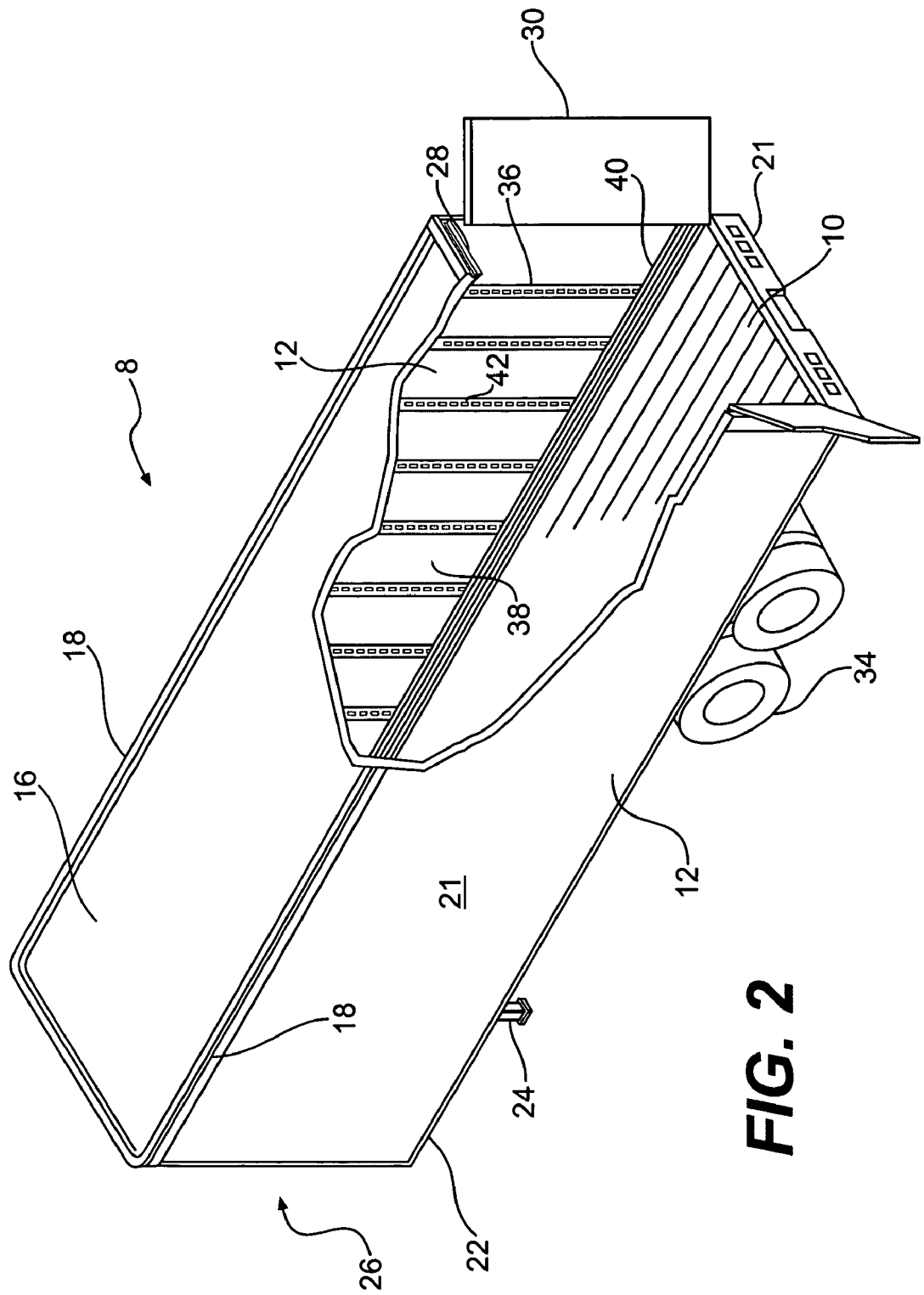
FIG. 2 is a partial perspective view of a trailer constructed in accordance with an embodiment of the present invention.

FIG. 2 illustrates a trailer 8 having a floor 10, two side walls 12 and a roof 16. Each side wall 12 is identically constructed. Thus, while the present discussion generally refers to one side wall, it should be understood that such structure is included in each side wall. Roof 16 is attached to side walls 12 by top rails 18, and each side wall is connected to floor 10 by a bottom rail 22 (one of which is shown in FIG. 2). The trailer includes retractable legs 24, a forward end wall 26 and a rearward end frame 28. Once assembled, the roof, floor and side walls form a trailer having a generally rectangular cross-section when viewed from the rear. The distance between inner surfaces of each side wall 12 is generally greater than 90 inches, and the distance between outer surfaces of each side wall 12 is generally less than 110 inches.

A pair of doors 30 at the trailer's rearward end are pivotally connected to rear end frame 28. A plurality of wheels, 34 support the trailer's rearward end and facilitate movement of the trailer when coupled to a tractor (not shown).

Figure 3:
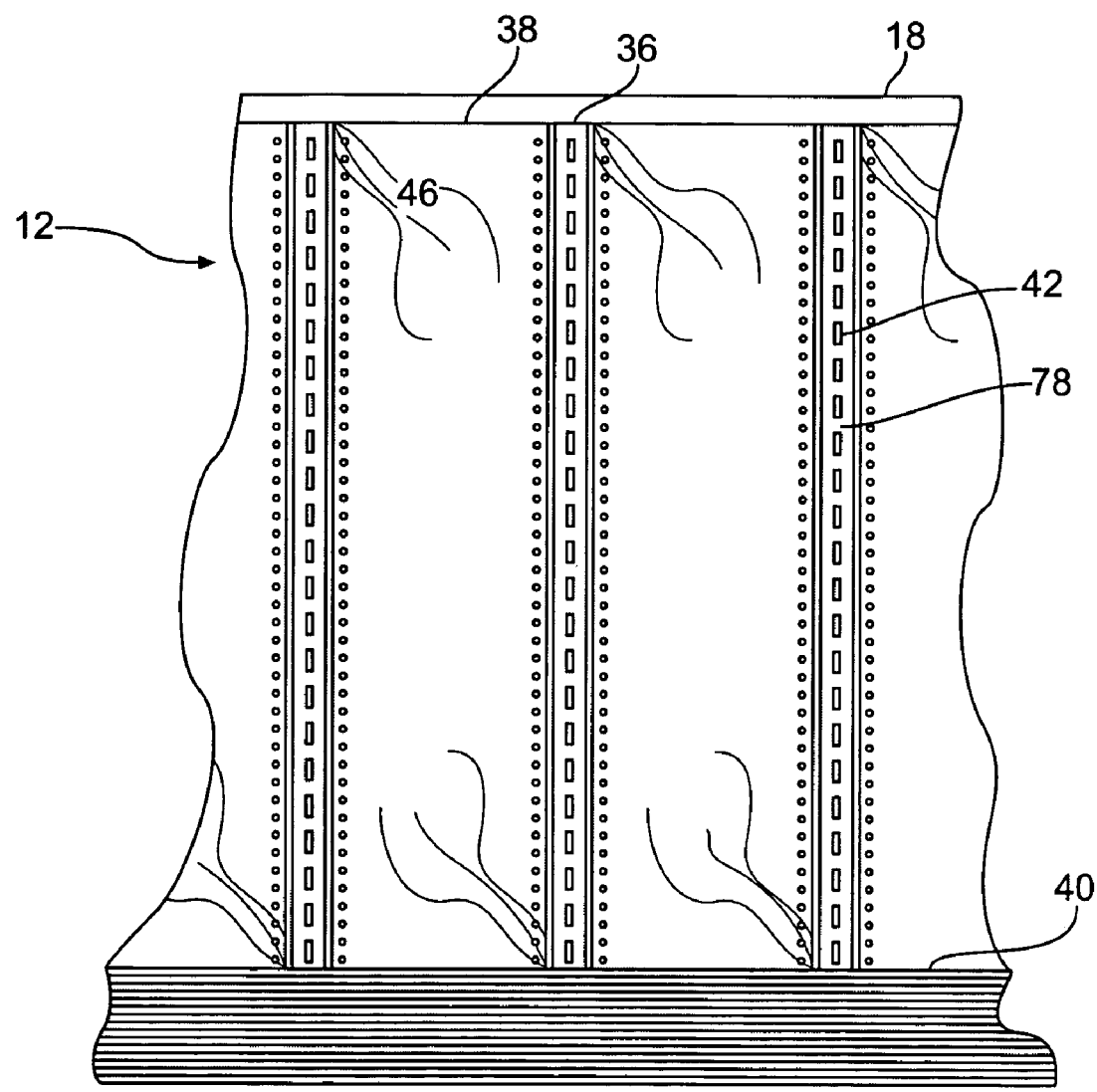
FIG. 3 is a partial plan view of the interior of a side wall constructed in accordance with an embodiment of the present invention.
Figure 9:
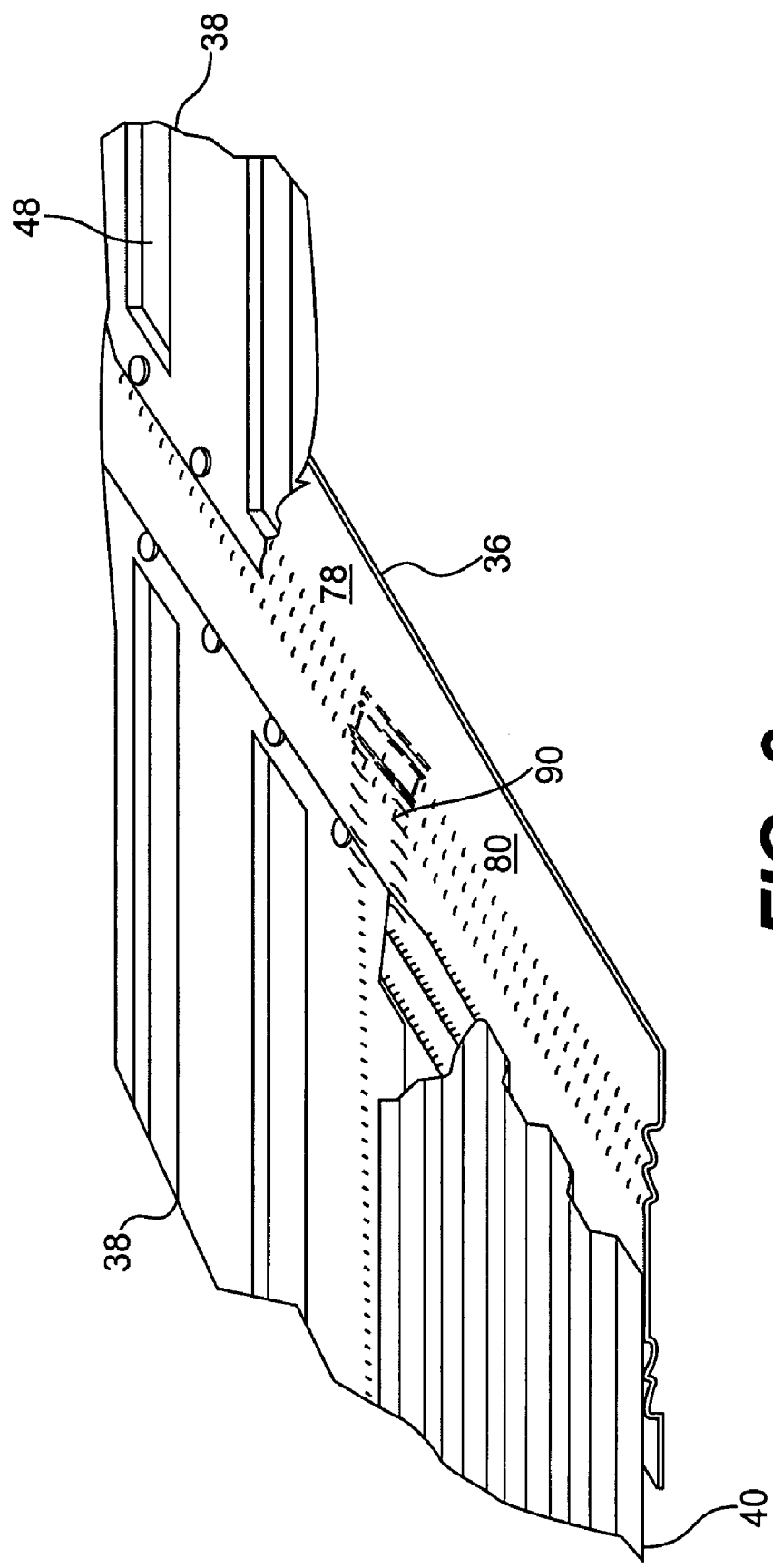
FIG. 9 is a partial cut-away plan view of side wall as shown in FIG. 7B.

Referring also to FIGS. 3 and 9, side wall 12 includes a plurality of vertical posts 36, a plurality of interior side wall liner panels 38 and one or more scuff bands 40. The liner panels interconnect the posts, and the scuff band is received within a recessed portion 80 of a bottom portion of posts 36. Each post includes a longitudinal front face 78 through which is defined a series of apertures 42 (not shown in FIG. 9) for receipt of cargo straps and the like to secure the trailer contents.

Panels 38 are fastened at 46 to posts 36 by screws, rivets, tapit pins, or any other suitable method. The panels are constructed of plywood or other suitable materials, for example steel. Referring specifically to FIGS. 7B, 7C, 8 and 9, corrugated metal panels include a plurality of recessed channels 48 that give the panels added structural strength and stiffness.

Figure 5:
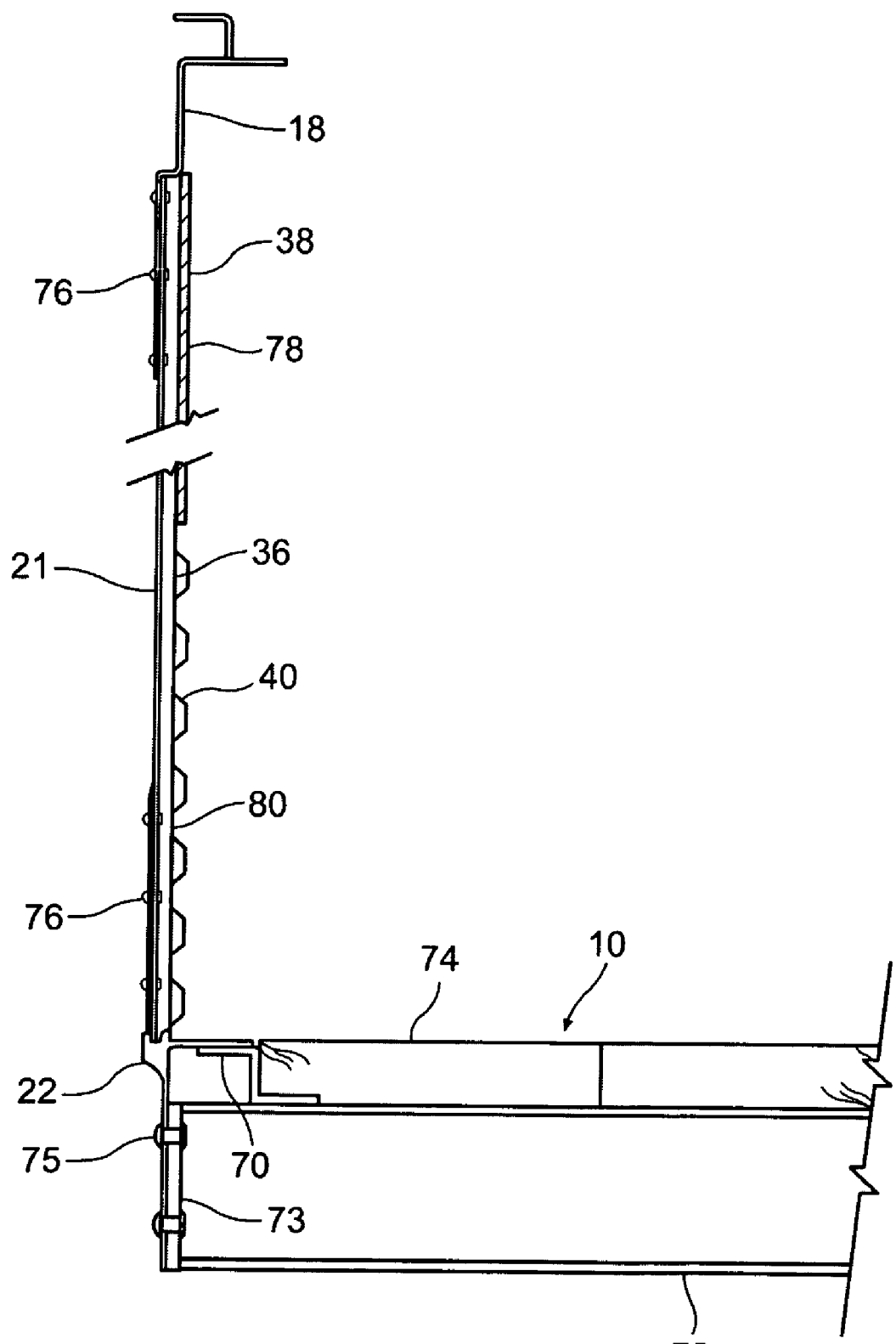
FIG. 5 is a partial cross-sectional view of a trailer floor, bottom rail, top rail, and side wall with recessed scuff band constructed in accordance with an embodiment of the present invention.

Referring again to FIG. 3, posts 36 are fastened to top rail 18 by suitable means such as rivets, screws or the like. Thus, the panels are secured to the top rail though their connection to the posts. An outer skin 21 (FIG. 2) is fastened to the trailer's top and bottom rails as discussed in more detail below. Referring also to FIG. 5, the portion of the top rail to which the posts are fastened extends behind liner panels 38 as the panels are illustrated in FIG. 3. Thus, it should be understood that FIG. 3 illustrates only an upper portion of top rail 18.

Figure 4:
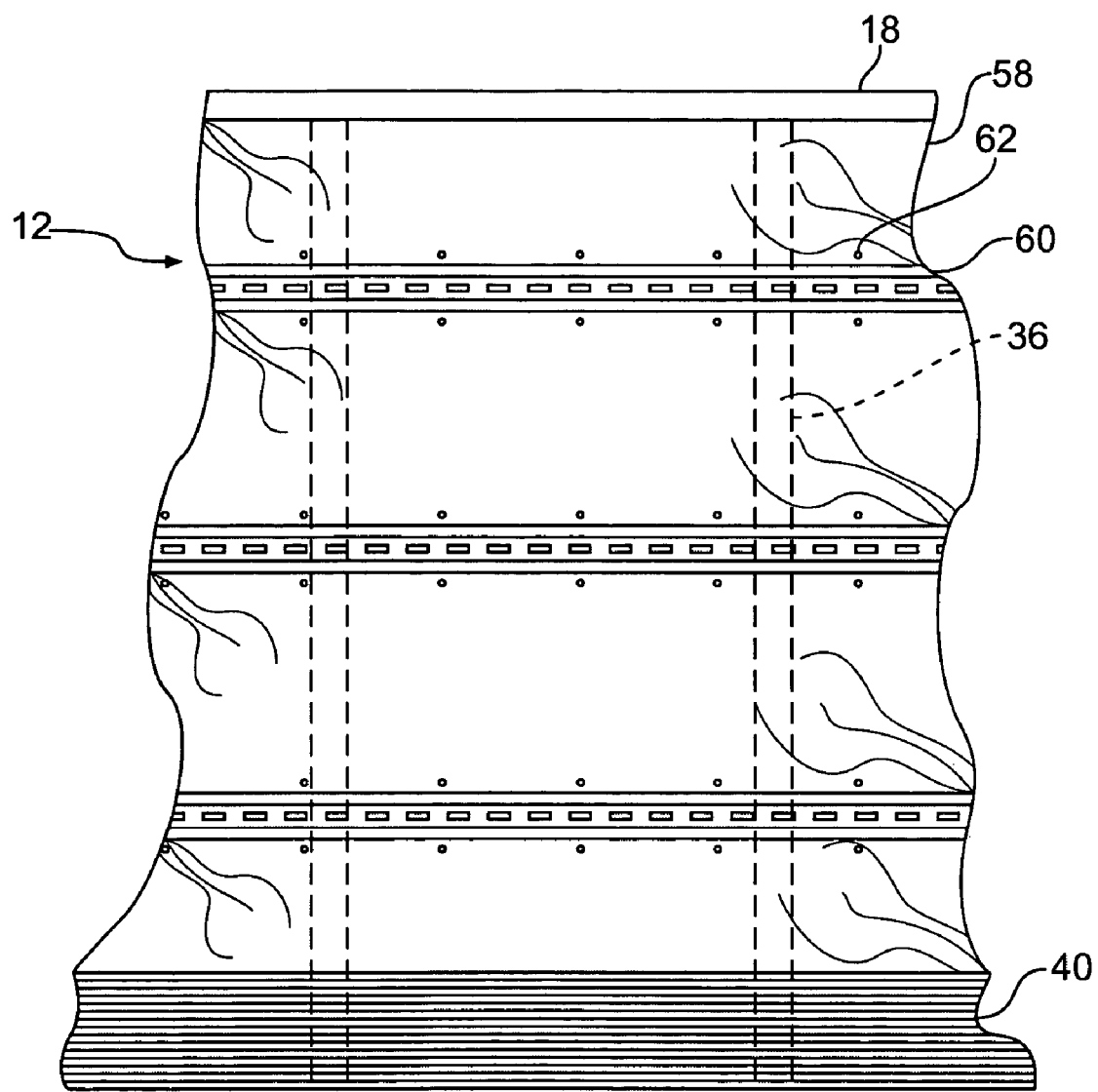
FIG. 4 is a partial plan view of the interior of a side wall constructed in accordance with an embodiment of the present invention.

In another embodiment illustrated in FIG. 4, side wall 12 includes horizontally oriented interior side wall liner panels 58 fastened to horizontal logistic tracks 60 by a suitable fastening means at 62. Top rail 18 may be separately fastened to the horizontal panels. Logistic tracks 60 are fastened to vertical posts 36 (in phantom) disposed intermittently along the trailer side wall between liner panels 58 and the outer skin. Panels 58, particularly the uppermost and lowermost panels, may also be fastened to vertical posts 36. Scuff band 40, which is fastened to vertical posts 36, may be corrugated or otherwise profiled or flat, but its inner face is generally coplanar with an interior surface of panels 58 and an interior face 78 of horizontal tracks 60.

Still referring to FIG. 4, vertical posts 36 are fastened to outer skin 21 (FIGS. 7A–7D) and to the top and bottom rails. Liner panels 58 may be of a wooden, polymer, composite or metallic construction. They may be attached to the tracks in any suitable manner, for example to longitudinal flanges recessed from, and on either side of, front face 78. Alternatively, tracks 60 may include multiple recessed flanges as described below with reference to FIGS. 7A–7D, particularly where the liner panels are corrugated.

As illustrated in FIGS. 2–5, scuff band 40 is of a generally corrugated metal construction. However, the scuff band may be constructed of any suitable material, for example wood, with or without a protective metal plate attached, or a non-corrugated metal. In preferred embodiments, scuff band 40 is formed from three-quarter inch plywood or sixteen gauge galvanized steel corrugated to a one-quarter inch depth.

Referring again to FIG. 2, exterior skin 21 is connected to top rail 18, bottom rail 22, end wall 26 and end frame 28. In one embodiment, outer skin 21 is constructed of "nominal" 050 aluminum, having a thickness of approximately 0.047 inches, and is fastened to vertical posts 36 by rivets or other suitable means. Vertical posts 36 are riveted to the top and bottom rails of both side frames.

As shown in FIG. 5, trailer floor 10 includes two longitudinally oriented zee-shaped members 70 (one of which is shown in FIG. 5) between bottom rail 22 and longitudinally oriented wooden floor planks 74. The zee-shaped members and the floor planks sit on a plurality of transverse I-beams 72. Each I-beam 72 includes an end plate 73 welded to each end, and end plates 73 are fastened to a bottom portion of bottom rail 22. Wooden planks 74 may be held between opposing zee-shaped members 70 by friction, or the planks may be bolted or otherwise fastened to I-beams 72 and/or zee-shaped members 70. Zee-shaped members 70 may be intermittently attached to bottom rails 22, I-beams 72, and/or planks 74. Outer skin 21 is riveted to vertical posts 36, and posts 36 are riveted to bottom rail 22 and top rail 18, as shown at 76.

Figure 6A:
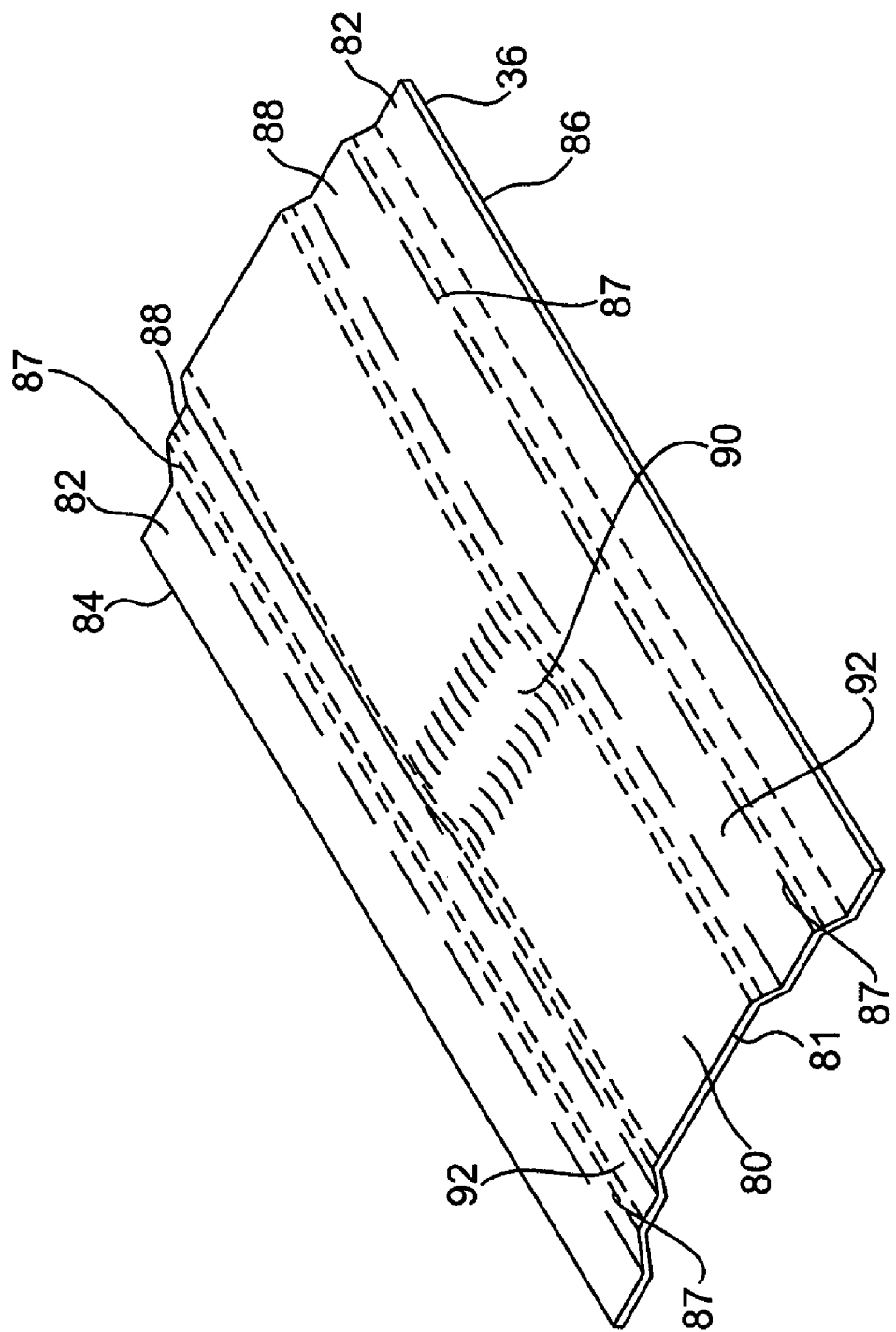
FIG. 6A is a perspective view of a bottom portion of a vertical side wall post showing a recessed portion of the post constructed in accordance with an embodiment of the present invention.

Referring now to FIG. 6A, an exemplary post 36 includes a recessed lower portion 80 defined in front face 78. Stepped-down pairs of longitudinal flanges 88 and 82 extend out from opposite sides of front face 78 to outer edges 84 and 86 and are parallel to each other and to front face 78. Flanges 88 are recessed approximately one-quarter of an inch from front post face 78 and define lateral edges 87 at the transition to flanges 82. Flanges 88 and 82 are generally parallel to front face 78. That is, they may deviate slightly from true parallel and/or may be discontinuous along their lengths, yet they are still able to receive and support liner panels (e.g. as shown in a three-flange embodiment in FIG. 9) and/or compress in an accordion fashion as described herein and generally encompassed by the present invention, as should be understood by those skilled in the art.

Figure 6B:
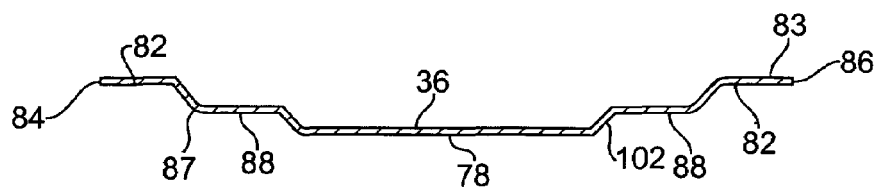
FIGS. 6B–6D show cross-sectional views of side wall posts in accordance with embodiments of the present invention.
Figure 6C:
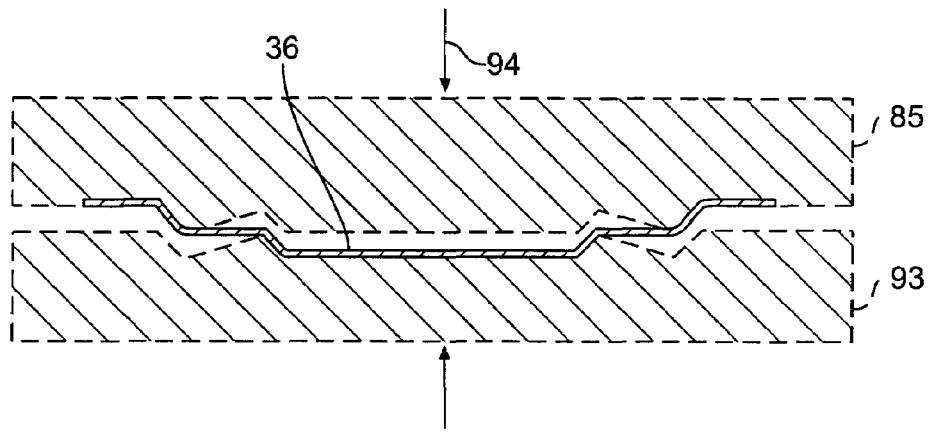
Figure 6D:
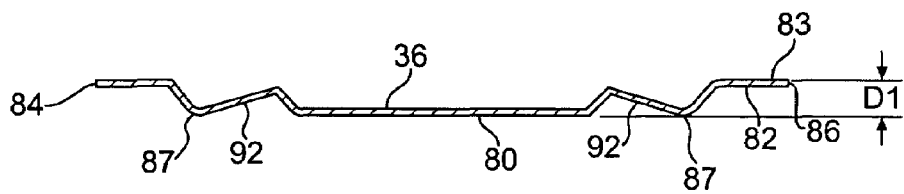

Referring also to FIGS. 6B and 6D, each flange 82 extends continuously along the length of post 36. In contrast, flanges 88 are parallel to surface 78 and flanges 82 only above a transition section 90. Below transition section 90, flanges 88 bend outward away from the plane defined by front post face 78, allowing portion 80 to recess to a position approximately coplanar with the inward surface of flanges 88 above the transition section. A distance D1 (FIG. 6D) between an exterior surface of the outer flanges and an interior facing surface of recessed portion 80 is approximately 0.37 inches in one embodiment.

Because flanges 82 maintain their positions across transition section 90, the movement of front face 78 inward to form recessed portion 80 pivots flanges 88 at edges 87, thereby forming a pair of angled surfaces 92. Edges 87 and post edges 84/86 remain straight and parallel to each other, and the indention of recessed portion 80 does not expand the width of post 36. Outer skin 21 may be attached to the post along the post's entire length, and the post may be attached both to the trailer's top and bottom rails, at the rear face of flanges 82 at 83.

Prior to the indention of recessed portion 80, the post's cross-section is consistent along its entire length, as shown in FIG. 6B. To form the recessed portion, and referring to FIG. 6C, the lower portion of post 36 is disposed between an upper die piece 85 and a lower die piece 93. Die piece 85 may be forced toward piece 93 as indicated at 94, or die piece 93 may be forced toward die piece 85 as indicated at 96, thereby deforming the post's lower end as shown in FIG. 6D. It should be understood that the post shapes may vary, and differing die configurations may therefore be used as appropriate. Preferably, however, the post's stamped lower end defines: a flat front outer surface and an accordion flange structure between the front face and the post's side edges. The die maintains the position of the side edges so that the accordion collapses as the die pushes in the selected portion of the front face. Accordingly, the post maintains a constant width while the recessed portion provides a surface for receipt of the scuff band.

When received by the recessed portion, at least a portion of the scuff band is disposed outward of the post front face. Referring to FIGS. 5 and 9, the scuff band may be almost entirely outward of the trailer's interior area so that scuff band's front surface is substantially parallel to post front face 78 above transition section 90. Returning to FIGS. 6A–6D, flanges 88 above transition section 90 may receive inner liner panels 38 (FIG. 2) against an abutting surface 102 so that the liner panels, post face 78 and the scuff band are substantially coplanar. That is, while there may be slight deviations in the surface, as should be understood in the art, the surface is coplanar from the standpoint of maximizing cargo space in the trailer.

It should be understood, however, that the scuff band may not necessarily be substantially coplanar with the trailer's inner side wall surface. For example, post portion 80 may be recessed by one-quarter inch but receive a half-inch thick scuff band. In this arrangement, only half the scuff band is outward of the inner side wall. Thus, the scuff band front face is inward of the inner side wall, but the recessed post nevertheless saves a quarter inch at each wall.

Figure 10:
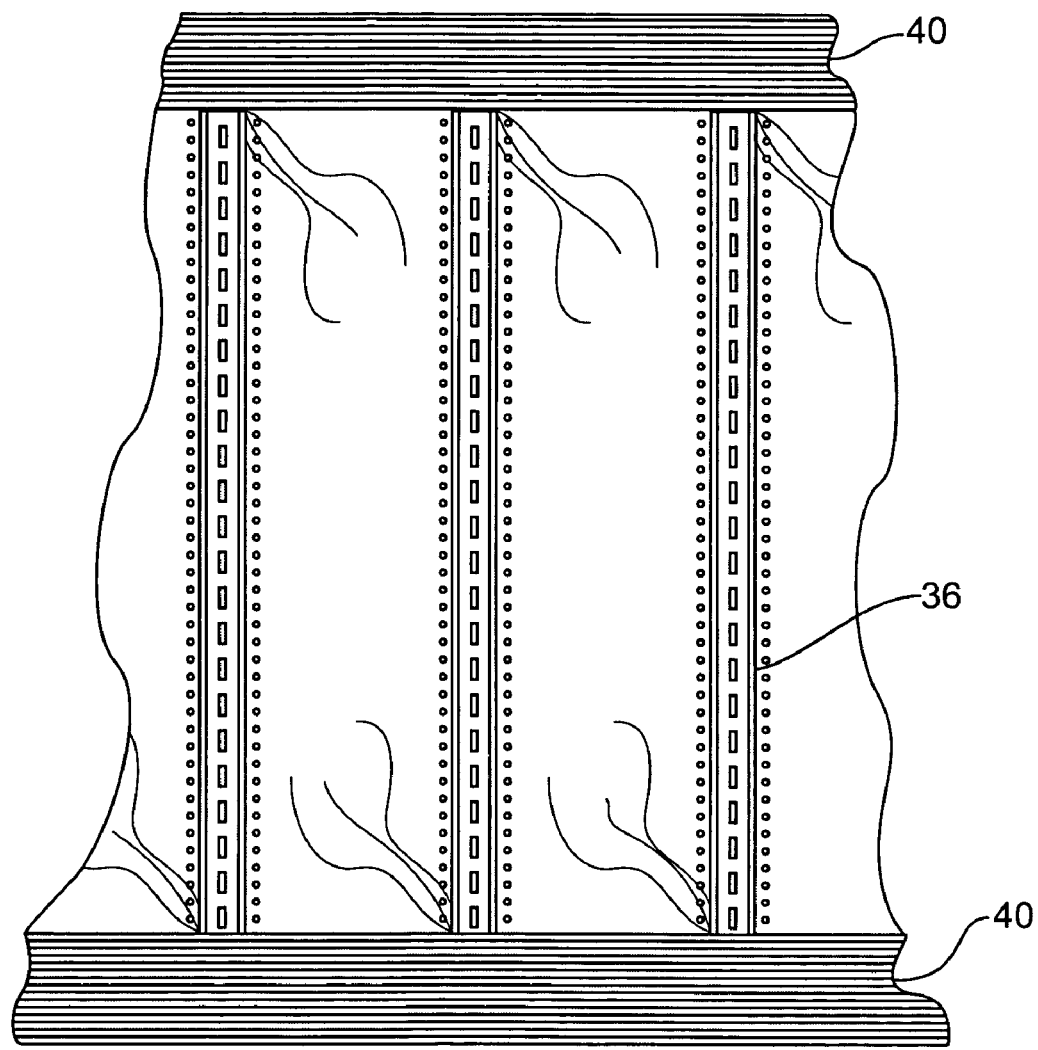
FIG. 10 is a partial plan view of the interior of a side wall constructed in accordance with an embodiment of the present invention.

Furthermore, the scuff band may be disposed at any suitable position in the wall. Referring to FIG. 10, for example, scuff bands are disposed at the top and bottom of the wall, and the posts define recessed portions (not shown) at both ends. Moreover, the posts may be recessed wherever it is desired to place scuff bands, and the posts may be recessed at one or more intermediate points to receive one or more scuff bands.

The horizontal logistic tracks illustrated in FIG. 4 receive the liner panels so that the panels are generally coplanar with the front faces of the tracks. The scuff band may be disposed below the liner panels within recessed portions in the vertical posts so that the panels, logistic tracks and scuff band form a substantially uniform surface.

Figure 7A:
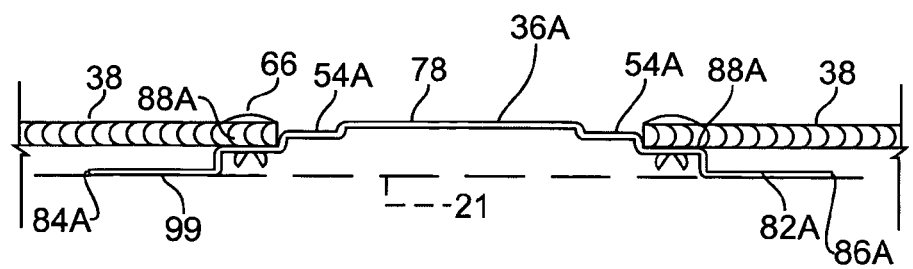
FIGS. 7A–7D show cross-sectional views of side wall posts in accordance with embodiments of the present invention.

It should be understood that the present invention encompasses various post configurations. Referring now to FIG. 7A, for example, post 36A is generally hat shaped and includes a front face 78 and three stepped-down longitudinal flanges on either side of the front face. A pair of flanges 54A extend outward form the front face, followed by flanges 88A and 82A. A plywood interior liner panel 38 is fastened to post 36A at first inner flanges 88A by tapit pins 66 so that an interior facing surface of panel 38 is substantially coplanar with front face 78. The heads of tapit pins 66 may extend out from this surface but could also be countersunk in the liner panels so that the heads are at or below the panel surfaces. Outer skin 21 is attached to rear faces of flanges 82A at 99.

Figure 7B:
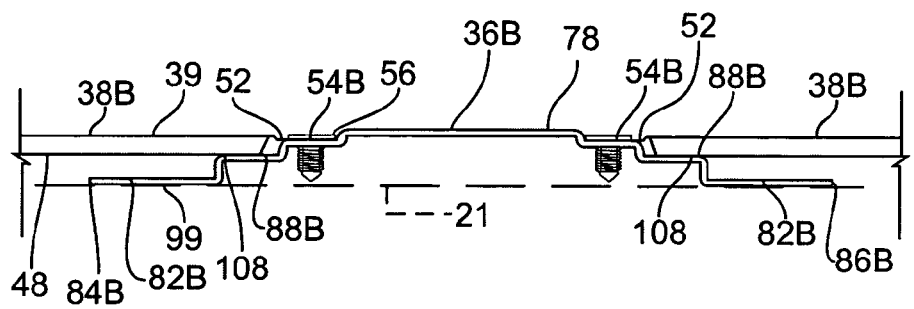
Figure 8:
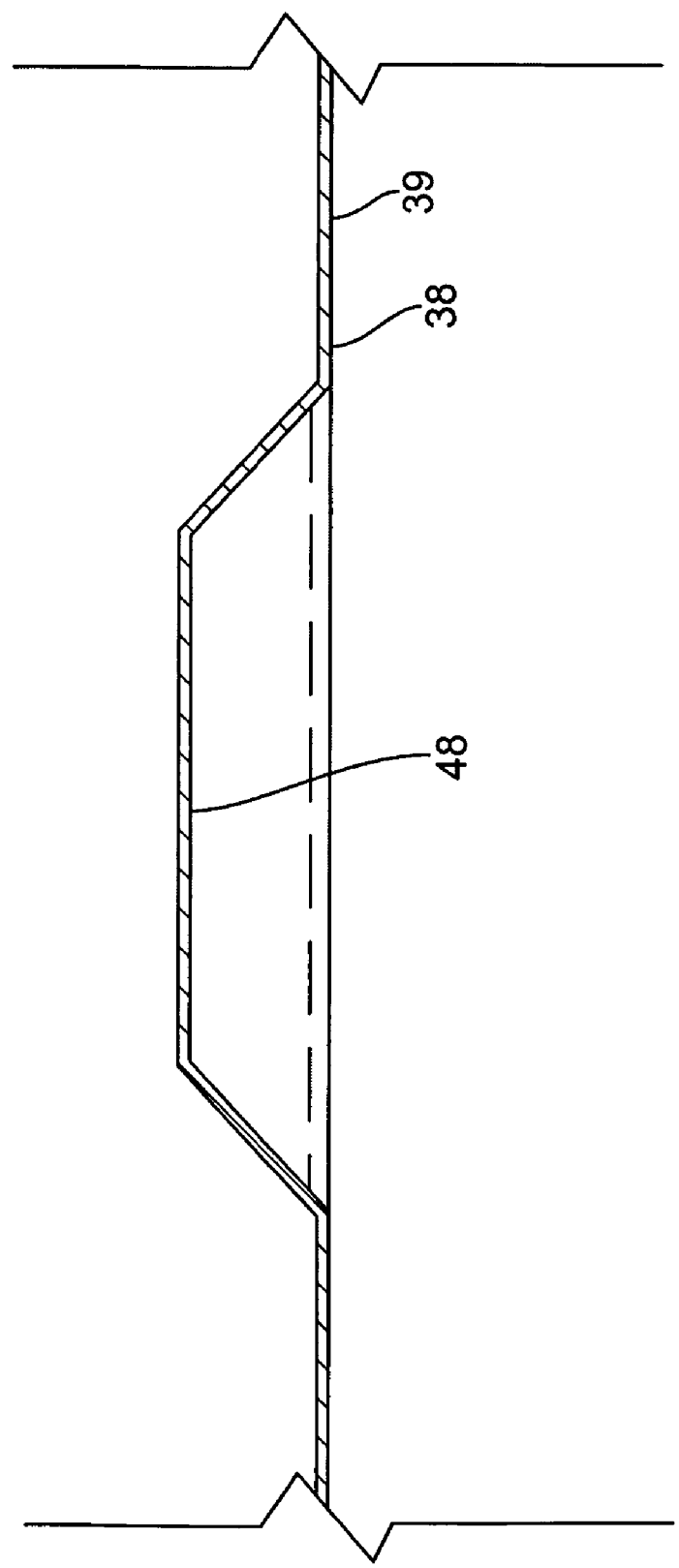
FIG. 8 is a partial cross-sectional view of a reinforcing channel pressed into a side panel as in FIGS. 7B and 7C.

Referring now to FIG. 7B (and FIG. 9), post 36B includes three flanges 82B, 88B, and 54B in a configuration similar to post 36A, but interior side wall liner panels 38B are of a metallic construction. Each metallic inner side wall liner panel defines a main body portion 39, which is corrugated by a series of parallel recesses 48 (FIG. 8), and flanges 52 that rest on flanges 54B. Screws 56 fasten flanges 52 to the flanges. In one preferred embodiment, as shown in FIG. 8, recessed channels 48 form a trapezoidal shaped depression in panel main body portion 39 and include opposing sides defining an angle of approximately 45 degrees with respect to a plane defined by an interior facing surface of the panel.

Flanges 52 in a preferred embodiment extend approximately one half inch from liner panel main body portion 39 to the panel's side edge. Liner flanges 52 may be formed by folding back a portion of the liner panel so that the thickness of panel flanges 52 is double the thickness of the main panel body. The width of panel flanges 52 may vary in accordance with the particular post design.

Figure 7C:
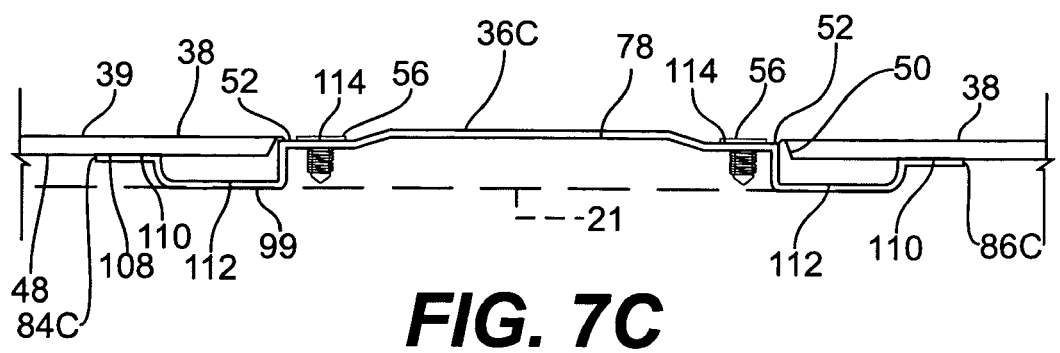

Referring to FIG. 7C, post 36C includes three stepped-down planar flanges behind post front face 78. A pair of outer flanges 110 extend inward from edges 84C and 86C. A pair of first inner flanges 112 are defined between outer flanges 110 and a pair of second inner flanges 114. Metallic interior side wall liner panels 38 are screwed to post 36C at second inner flanges 114. An adhesive sealant may be applied between outer flanges 110 and a rear face 108 of recessed channels 48. Referring also to FIG. 7B, an adhesive sealant could also be used between channel rear face 108 and first inner flanges 88B.

In the embodiments illustrated in FIGS. 7A–7B, the post's rearwardmost planar surface is defined on an exterior surface of outer flanges 82A–B and is adjacent to post edges 84 and 86. In these embodiments, outer skin 21 (shown in phantom on FIGS. 7A–7D) attaches to outer flanges 82A–B at 99. In the embodiments illustrated in FIGS. 7C and 7D, however, outer skin 21 fastens to an exterior surface of first inner flanges 112. Thus, it should be understood that the present invention encompasses any suitable lateral position of the flanges.

Figure 7D:
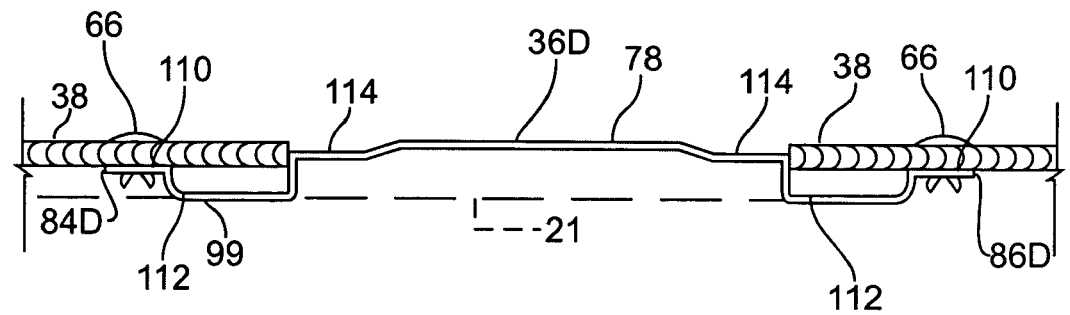

Referring to FIG. 7D, post 36D is configured similarly to post 36C, but it receives a plywood interior side wall liner panel 38 fastened to outer flanges 110 by tapit pins 66. Plywood panels 38 are approximately one quarter of an inch in thickness.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is claimed is:

1. A cargo trailer for use with a motorized vehicle, said trailer comprising:
    a plurality of wheels;
    a floor supported by said plurality of wheels; and
    a pair of side walls extending vertically upward from opposite edges of said floor and defining a cargo area between said side walls, said cargo area defining a width between said side walls, at least one of said side walls including
        an outer skin;
        a plurality of interior side wall liner panels spaced apart from said outer skin, and
        a plurality of elongated vertical posts disposed between said outer skin and said liner panels, wherein each said liner panel extends between a respective pair of adjacent said posts, wherein
            each said post includes a front surface facing toward said cargo area and a rear surface facing away from said cargo area, and one of said front surface and said rear surface defines a portion thereof that is recessed toward the other of said front surface and said rear surface, wherein said recessed portion receives another part of said at least one side wall whereby the width of said cargo area is increased.

2. The trailer as in claim 1, wherein said recessed portion is located at a bottom end of said vertical post.

3. The trailer as in claim 2, wherein said another part of said at least one side wall is a scuff band.

4. The trailer as in claim 1, wherein said vertical post includes two first longitudinal flanges generally parallel to and disposed on opposite sides of said front surface between said front surface and respective outer edges of said post, said first longitudinal flanges being recessed from said front surface between said front surface and said outer skin, and wherein each said liner panel is attached to a respective pair of said posts at a respective said first flange.

5. The trailer as in claim 4, wherein each of said vertical posts includes two second longitudinal flanges generally parallel to and disposed on opposite sides of said front surface and recessed from said first longitudinal flanges between said first longitudinal flanges and said outer skin, and wherein said outer skin is fastened to each said vertical post at said two second longitudinal flanges.

6. A cargo trailer for use with a motorized vehicle, said trailer comprising:
   a plurality of wheels;
   a floor supported by said plurality of wheels;
   a roof and
   a pair of side wails extending vertically upward from opposite edges of said floor to said roof and defining a cargo area between said side wails, at least one of said side walls including
      an outer skin,
      a plurality of interior side wall liner panels spaced apart from said outer skin and defining an inner surface, and
      a plurality of elongated vertical posts disposed between said outer skin and said liner panels, wherein each said liner panel extends between a respective pair of adjacent said posts, wherein
      each said post defines a front face facing toward said cargo area and a rear face facing away from said cargo area so that a width is defined between said front face and said rear face, and
      each said post defines a first portion thereof at which said width is reduced from said width of a second portion of said post that is longitudinally aligned with said first portion, wherein said first portion is smaller than said second portion.

7. The trailer as in claim 6, wherein said front face is recessed from said second portion to said first portion.

8. The trailer as in claim 7, wherein said first portion receives a scuff band.

9. The trailer as in claim 6, wherein said first portion is located at a bottom end of said vertical post.

10. The trailer as in claim 6, wherein each said vertical post defines two said first portions.

11. The trailer as in claim 6, wherein each said side wall includes a plurality of said elongated vertical posts.

12. A cargo trailer for use with a motorized vehicle, said trailer comprising:
   a plurality of wheels;
   a floor supported by said wheels; and
   a pair of side walls extending vertically upward from opposite edges of said floor and defining a cargo area between said side walls, said cargo area defining a width between said side walls, each said side wall including,
      an outer skin,
      a plurality of interior sidewall liner panels spaced apart from said outer skin,
      a plurality of elongated vertical posts disposed between said outer skin and said liner panels, wherein each said liner panel extends between a respective pair of adjacent said posts, wherein
      each said post defines a front face facing toward said cargo area and disposed between edges of opposing adjacent said liner panels, and a rear face facing away from said cargo area so that a width is defined between said front face and said rear face, and
      each said front face defines a first portion thereof and a second portion thereof that is smaller than said first portion, and that is longitudinally aligned with and below said first portion, and that is received from said first portion toward said rear face, and
      a scuff band is disposed horizontally proximate said floor and is received in a recess in said front face defined at said second portion.

* * * * *

UNITED STATES PATENT AND TRADEMARK OFFICE
CERTIFICATE OF CORRECTION

| | | |
|---|---|---|
| PATENT NO. | : 6,979,051 B2 | Page 1 of 1 |
| APPLICATION NO. | : 11/046736 | |
| DATED | : December 27, 2005 | |
| INVENTOR(S) | : John M. Jones et al. | |

It is certified that error appears in the above-identified patent and that said Letters Patent is hereby corrected as shown below:

Column 5, line 3, after "defines", please delete the ":"

Claim 6, column 7, line 30, please delete the word "root" and replace with --roof;--.
Claim 6, column 7, line 31, after "side", please delete the word "wails" and replace with --walls--.

Signed and Sealed this

Twelfth Day of September, 2006

JON W. DUDAS
*Director of the United States Patent and Trademark Office*